Nov. 10, 1925.                                                    1,561,328
L. M. HENDLER
VEHICLE BODY
Filed Jan. 11, 1924                          2 Sheets-Sheet 1

Inventor,
Lionel M. Hendler.

By  Robert Watson
Attorney

Nov. 10, 1925.  1,561,328
L. M. HENDLER
VEHICLE BODY
Filed Jan. 11, 1924  2 Sheets-Sheet 2

Inventor,
Lionel M. Hendler.
By Robert Walston
Attorney

Patented Nov. 10, 1925.

1,561,328

UNITED STATES PATENT OFFICE.

LIONEL MANUEL HENDLER, OF BALTIMORE, MARYLAND.

VEHICLE BODY.

Application filed January 11, 1924. Serial No. 685,653.

*To all whom it may concern:*

Be it known that I, LIONEL MANUEL HENDLER, a citizen of the United States, residing at Baltimore, in the State of Maryland, have invented certain new and useful Improvements in Vehicle Bodies, of which the following is a specification.

This invention relates to a vehicle body designed particularly for use in the ice cream trade for carrying advertising matter and bill poster's equipment, and also, by its form and appearance, adapted to serve as an advertisement for the business with which it is associated.

In carrying out the invention, I provide a vehicle body, comprising a cab and a flat compartment extending from the cab and having a door at the rear for inserting and removing ladders, or whatever devices it may be desirable to carry, and upon the flat compartment is arranged another compartment, for carrying advertising signs, posters and the like, shaped to represent a cone of ice cream mounted upon a saucer, or it may be shaped to represent a body of ice cream in other forms in which it is commonly served, such as bricks. Access to this upper compartment of the vehicle is through a passageway connecting said compartment with the cab, instead of through doors in the side or rear of the compartment, which doors, if present, would not only mar the outward appearance of the compartment, but would provide cracks or crevices through which rain might enter the compartment. Also, as the compartment is without doors in its exposed walls, the materials within the compartment cannot become lost, as might happen if the compartment had outer doors and the latter were left open.

In the accompanying drawing.

Figure 1:
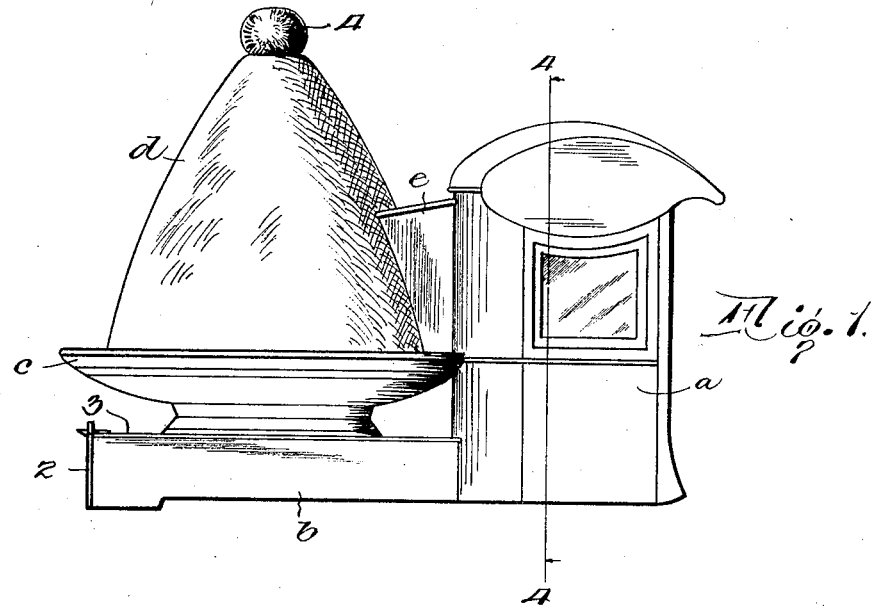
Fig. 1 is a side elevation of the vehicle body.
Figure 2:
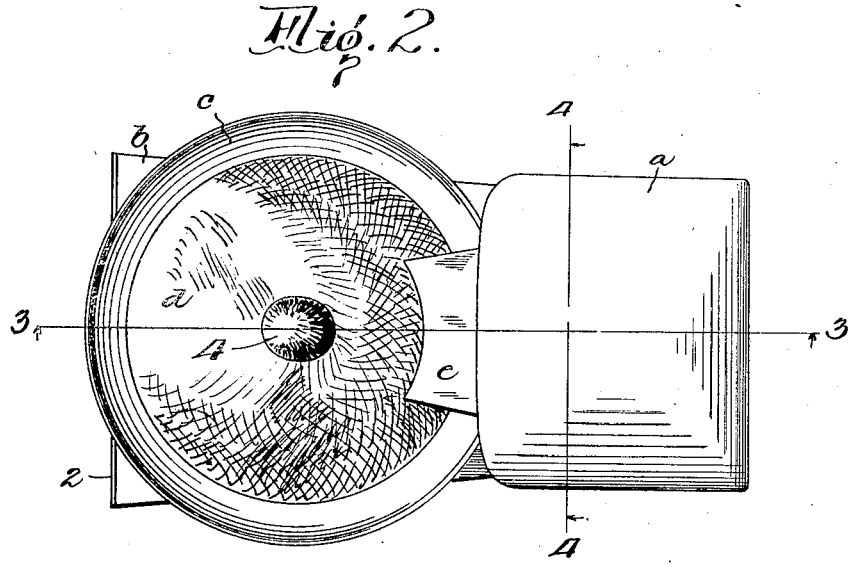
Fig. 2 is a top plan view of the same.
Figure 3:
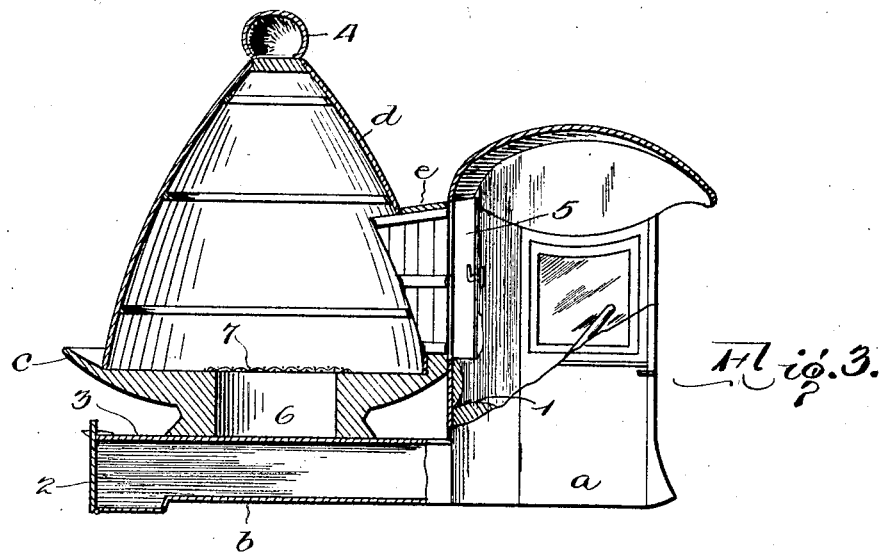
Fig. 3 is a section on the line 3—3 of Fig. 2, partly in elevation.
Figure 4:
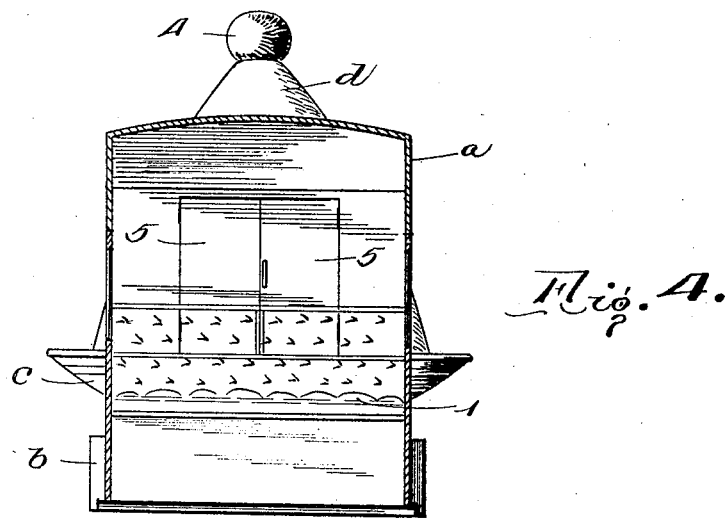
Fig. 4 is a section on the line 4—4 of Figs. 1 and 2.

Referring to the drawing, $a$ represents the front or cab portion of the vehicle containing the driver's seat 1; $b$ represents a flat rectangular compartment extending rearwardly from the cab and adapted to rest upon the chassis of the vehicle, this compartment being provided with a rear door 2. Upon the top 3 of the compartment $b$ is arranged a saucer-shaped base $c$, and supported upon this base is a conical housing $d$, which may be surmounted by a sphere or globular part 4. The base, conical housing and the globular part 4 outwardly resemble a saucer with a cone of ice cream surmounted by a cherry. A passageway $e$ connects the compartment formed by the housing $d$ and base $c$ with the interior of the cab, and the doors 5, which form a part of the back of the cab, and also of the back of the seat, are provided for closing the passageway $e$. The base is provided with a central cavity 6, which forms a small compartment, which may be enclosed or covered by a suitable covering, indicated as a removable wire screen 7.

The outward form of the vehicle body readily suggests its association with the ice cream business, and its intended purpose is to carry advertising matter, and ladders, paste pots and utensils for use in posting such advertising matter. Thus, the cone-shaped compartment may be provided with shelves, if necessary, for containing the advertising matter; the paste pots, tools, brushes, etc. may be carried in the small compartment 6, and the flat compartment $b$ is designed to carry step ladders and also large posters.

It will be noted that the conical compartment has no opening at the rear and that all of the materials which are placed in this compartment, or removed from the compartment, must pass through the passageway $e$ to and from the cab. Usually advertising wagon bodies have doors in the rear or the sides of the carrying compartments; but such doors would mar the appearance of the cone in the present body, and also a door at the rear may sometimes be left open, with a loss of materials; whereas, with the entrance to the compartment only through the cab materials cannot be lost.

What I claim is:

1. A vehicle body comprising a cab, a lower flat compartment extending rearwardly from the cab and having a door at its rear end, and an upper compartment supported on the lower compartment and extending thereover substantially from end to end of the latter, the wall of said upper compartment constituting a top and side walls for the body, said upper compartment being closed at the rear and sides and having an entrance opening at the front communicating with the cab.

2. A vehicle body comprising a cab, a lower flat compartment extending rearwardly from the cab and having a door at its rear end, and an upper compartment supported on the lower compartment and extending thereover substantially from end to end of the latter, the wall of said upper compartment constituting a top and side walls for the body, said upper compartment being closed at the rear and sides and having an entrance opening at the front and a passageway leading from said opening into the cab.

In testimony whereof I hereunto affix my signature.

LIONEL MANUEL HENDLER.